(No Model.)
A. F. W. PARTZ.
WASHER.
No. 454,289. Patented June 16, 1891.
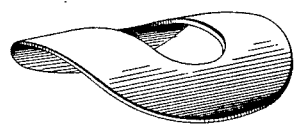
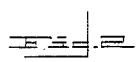
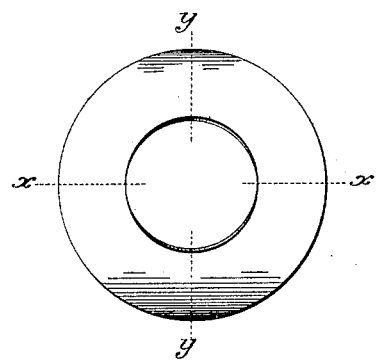
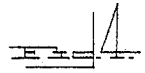
WITNESSES:
INVENTOR,
Aug. F. W. Partz.
BY
HIS ATTORNEY.

UNITED STATES PATENT OFFICE.

AUGUST F. W. PARTZ, OF PHILADELPHIA, PENNSYLVANIA.

WASHER.

SPECIFICATION forming part of Letters Patent No. 454,289, dated June 16, 1891.

Application filed October 7, 1889. Serial No. 326,200. (No model.)

*To all whom it may concern:*

Be it known that I, AUGUST F. W. PARTZ, a citizen of the United States, residing at Philadelphia, in the State of Pennsylvania, have invented a certain Improvement in Washers, of which the following is a full and exact description, reference being had to the accompanying drawings.

This invention relates to washers.

The object of the invention is to produce a washer by the use of which the loosening and unscrewing of bolt-nuts will be prevented by maintaining a permanent pressure against them.

With this object in view the invention consists in a washer bent throughout in an arc, presenting two opposite points of its periphery to the wood or metal whereon the washer is to be applied. While at right angles to these points it presents a diametric bulge whereby by the screwing down of the nut the washer becomes flattened, the resiliency of the washer in this position serving to bind the nut against turning.

Nuts on bolts used on wood commonly become loosened through shrinking or decaying of the wood, and likewise do nuts on bolts joining pieces of metal become loosened, primarily through an unequal expansion or contraction by heat or cold, whereupon they get easily further loosened or unscrewed by vibration. To prevent this, I construct a washer as illustrated in the accompanying drawings, in which—

Figure 1 is a perspective view of the washer made in accordance with my invention. Fig. 2 is a face view. Fig. 3 is a section on the line *x x* of Fig. 2. Fig. 4 is a section on the line *y y* of Fig. 2.

These washers are punched out of soft sheet-steel, then pressed between suitably-shaped iron blocks into an arc, and finally hardened in the usual manner to a temper of an ordinary steel spring of a thickness corresponding to that of a washer.

The curvature of the washers should be that of a circle of from three to four times their own diameter, the washers being so formed as to be curved throughout from opposite points and that when these points rest upon a plane surface those at right angles will present a diametric bulge to the nut.

The washers are applied in the same way as the washers now in general use, but with different effect, for the reason that as they are straightened by screwing down the nuts they exert by their tendency to spring back into a curve a permanent pressure against them, and so prevent their turning loose through jarring or vibration.

While I have particularly shown my improved washer in circular form I do not wish to limit myself in this respect, as it is obvious that the washer may be constructed of any desirable and convenient form other than circular.

Having thus fully described my invention, what I claim as new, and desire to secure by Letters Patent, is—

A washer bent throughout in an arc, presenting two opposite points of its periphery to the wood or metal whereon the washer is to be applied, while at right angles to these points it presents a diametric bulge, whereby by the screwing down of the nut the washer becomes flattened, the resiliency of the washer in this position serving to bind the nut against turning, substantially as described.

AUGUST F. W. PARTZ.

Witnesses:
R. T. FRAILEY,
JOSEPH THOMASSON.